Nov. 15, 1932.   V. P. WILLIAMS   1,887,793
MEANS FOR PREVENTING LEAKAGE OF OIL
Filed April 19, 1930   2 Sheets-Sheet 1
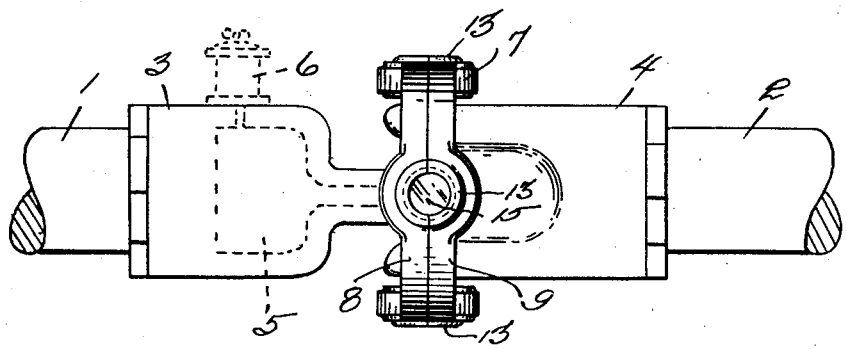
- FIG - 1 -
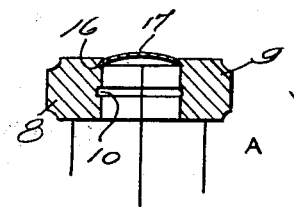
A
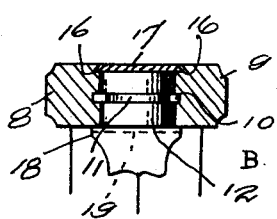
B
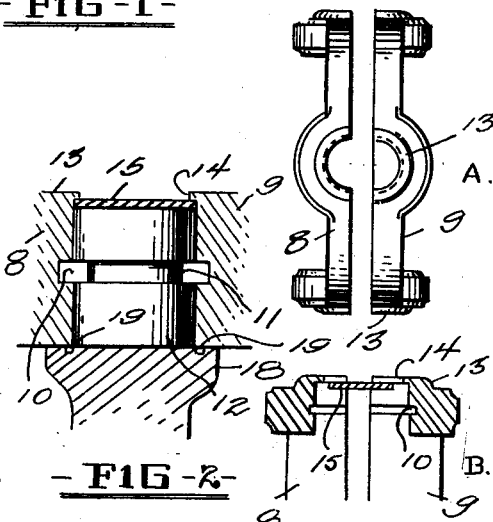
- FIG - 2 -
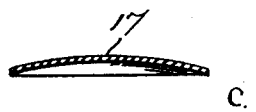
FIG - 4 -
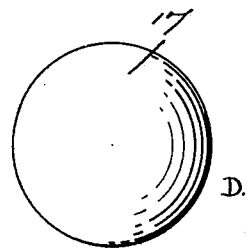
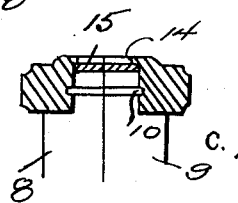
Inventor
VILLOR P. WILLIAMS.
By
Attorney Nov. 15, 1932.  V. P. WILLIAMS  1,887,793
MEANS FOR PREVENTING LEAKAGE OF OIL
Filed April 19, 1930  2 Sheets-Sheet 2
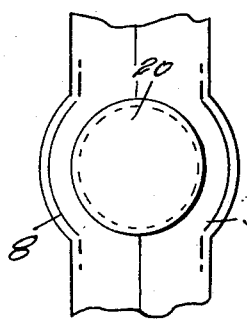
- FIG -5-
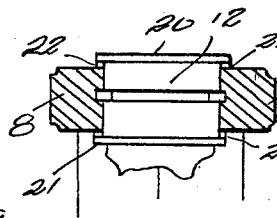
- FIG -6-
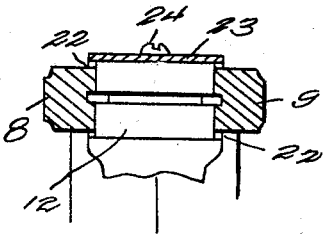
- FIG -7-
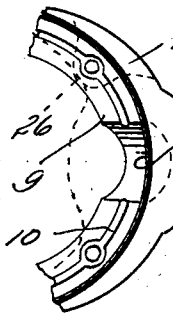
- FIG -10-
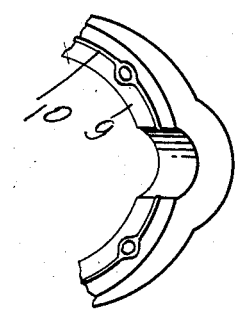
- FIG -8-
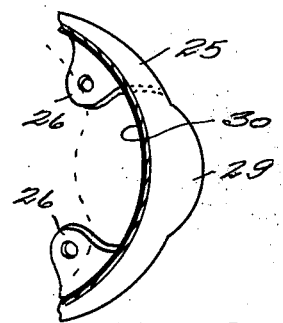
- FIG -9-
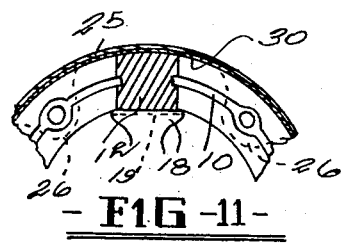
- FIG -11-
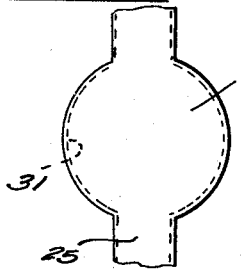
- FIG -12-
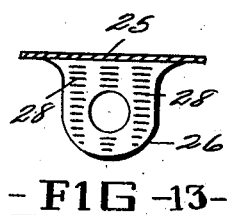
- FIG -13-
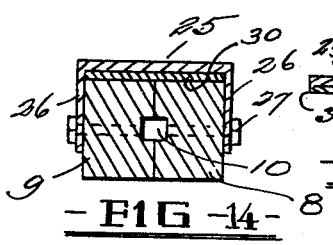
- FIG -14-    - FIG -15-
Inventor
VILLOR P. WILLIAMS,
By *[signature]*
Attorney Patented Nov. 15, 1932

1,887,793

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

MEANS FOR PREVENTING LEAKAGE OF OIL

Application filed April 19, 1930. Serial No. 445,707.

My present invention, in its broad aspect, has to do with improvements in means for preventing leakage of oil from bearings and other lubricated surfaces, and it is especially adapted for use in conjunction with the improvements defined in my co-pending applications for patent filed April 2nd 1930, Serial Numbers 441,145 and 441,146. It has been found very difficult to prevent leakage of oil from small bearing surfaces where expediency prevents the use of stuffing boxes and efficient packing. An instance of such leaking bearing is found in the usual universal joint where the parts having the bearing surfaces are relatively small, and it is necessary to use a casing or shell to prevent soiling of adjacent parts of a machine. A leaky bearing is notoriously extravagent of oil since oil passes from the bearing very soon after it is lubricated; accordingly such a bearing necessitates the use of a constant flow of oil, as from a cup or the like. Especially has it been found difficult to "cap" the end of a bearing where the end of the shaft is flush or substantially flush with its journal, or where the line of the rotating part and its bearing support is a flush surface. Of course a cap may be used with packing and the like, but to use such a cap is prohibitive with small parts, to say nothing of the incident expense, and furthermore where a cap is used the support must be drilled to receive fasteners and the caps must be inspected regularly. In the universal joint defined in my co-pending application Serial #441,146, and in the system of lubrication defined in my co-pending application Serial #441,145 lubricating oil is forced to all the working surfaces of the pins and of the ring. However, some leakage of oil takes place, and in connection with the joint it is desirable to use a casing or shell. My present application has to do with the prevention of leakage of oil, especially with the type of bearing shown in conjunction with my co-pending applications above identified, and when my present invention is used the so called casing or shell may be entirely eliminated. Furthermore my present invention prevents entrance of dust to the working parts; prevents dilution of the lubrication by extraneous substances, or gritting-up of the lubricating oil, and in addition my present device is cheap, and effective and does not interfere with cleaning or wiping the parts, and may be readily removed or replaced or the like.

In practice the detail construction of my device may be considerably changed since the means for preventing leakage must be made to conform to the size, shape and type of parts lubricated; and the right to make such changes is especially reserved provided they fall within the spirit and concept of the invention as hereinafter described in detail.

In the drawings wherein is illustrated an embodiment and several modifications of my invention:—

Figure 1 is a view of a universal joint having the pins packed to prevent leakage of oil;

Figure 2 is an enlarged section showing a form of my invention, as disclosed in Figure 1, for preventing leakage of oil from about the ends of the pins;

Figure 3, views A—B—C show the manner of constructing the ring, and assembling the type of leak prevention means shown in Figures 1 and 2. In this figure, view A is a detail of the ring sections; view B is a section through the ring, before the sections are clamped together, and view C is a view through the ring with the sections clamped together to hold the packing disk in place;

Figure 4, views A—B—C—D shows a modified form of my invention utilizing a spring metal oil sealing cap; and in which view A is a section of a ring with the cap in place but not forced or sprung down into place; view B is a section of the ring with the cap in its operative position; view C is a section of the oil sealing cap, and view D is a plan view of the oil sealing cap;

Figures 5, 6 and 7 show another modified form of my invention in which the pin of a universal joint is provided with both an end and a base flange and packing to seal the bearing of the pin against leakage; this form is shown in Figures 5 and 6, and in Figure 7 an annular plate is attached to the end of a pin and serves a similar purpose;

Figures 8, 9, 10, 11, 12, 13, 14 and 15 show still another form of my invention in which an exterior band and packing is used to seal the ring and pin ends against leakage of oil. In these Figure 10 is a fragmentary perspective view of a ring section with the band in place; Figure 8 is a fragmentary perspective view of a ring section with the band removed; Figure 9 is a fragmentary perspective view of the band and packing; Figure 11 is a fragmentary sectional side view of a ring section; Figure 12 is a detail of the band where it is enlarged to cap a pin; Figure 13 is a view of a corrugated retaining ear of the band; Figure 14 is a transverse section through a ring showing how the packing is disposed beneath the band, and Figure 15 is a section through the band showing how the packing is retained in place.

In the drawings wherein like characters of reference are used to designate like or similar parts throughout the several views thereof:—

The numerals (1) and (2) designate the ends of shaft sections coupled by a universal joint having knuckles (3) and (4); the knuckle (3) has a hollow cavity (shown in dotted lines) for receiving oil, and designated (5) and filled from an oil cup (6) or other suitable source of lubricant for the joint after the manner disclosed in my co-pending applications Serial Nos. 441,145 and 441,146. As shown in Figures 8—9—10 and 11 the universal joint ring (7) is formed in sections (8) and (9) grooved to provide an oil channel (10) which communicates with the groove (11) in the pins (12) so that the pins are kept lubricated by a flow of oil from the cavity (5) through bores (not shown) to certain of the pins (12) and grooves (11) thence to the oil channel (10) and around the same to the other pins (12) after the manner herein shown and described at greater length in my co-pending applications above identified. However, it has been found that leakage of oil exists between the ring sections (8) and (9) and about the ends of the pins (12), and my present invention has to do with the prevention of such leakage.

Since my universal joint is assembled by bolting or otherwise attaching the sections of the ring together to retain the pins (12), I am enabled to prevent leakage of oil from about the ends of the pins by forming an annular boss (13) about the ends of the pins on the ring sections (8) and (9), said boss being annularly flanged as at (14) to retain in place a metallic disk (15) as shown in Figures 1, 2 and the view C of Figure 3. In operation, when the ring sections are ready to be put together, the disk (which may be of metal or composition) is inserted over the ends of the pins as shown in view B of Figure 3, so that when the ring sections are forced together the disk (15) is clamped in place as shown in view C of Figure 3, or in Figure 2 where the assembly is shown, thereby preventing seepage of oil from the bearing.

In Figure 4 is shown the preferred form of my invention, and in this figure, the pins are disclosed as terminating short of the outer rim of the ring which is extended so that the ends of the pins (12) are sunk within the peripheries of the ring bearing. The walls of the ring are annularly recessed as at (16) and in the recesses are seated spring metal disks (17) of such a size that they may be easily set over the ends of the pins when the ring is assembled, and then given a slight tap with a hammer or the like to spring out into the recesses as shown in view B of Figure 4. The disk (17) is slightly convex as shown in views C and D, so that a slight tap with a hammer or the like will change its contour to seat it in the grooves or recesses (16) to completely seal the pins against leakage of oil. In practice the shanks of the pins are formed with shoulders (18) in both of the above forms, and these shoulders seat against the inner periphery of the ring to seal the bearings of the pins against leakage of oil, and the shoulders may be grooved as at (19) to receive packing (not shown) to make a completely tight joint.

In Figures 5, 6 and 7 another modified form of my invention is shown in which the pins have end flanges (20) and base flanges (21) between which and the periphery of the ring sections is packing (22) so that the pins are sealed against leakage of oil. The form shown in Figure 7 contemplates attaching a plate (23) to the end of each pin by a screw or the like (24) and which extends out over the edge of the pin to simulate a flange under which packing (22) may be placed to seal the bearing.

A desirable form of sealing means is disclosed in Figures 8 to 15, when it is desired not only to seal the pins against leakage of oil, but the ring sections as well. In this form I provide an annular metallic band (25) which has depending ears (26) on either side through which the attaching bolts or screws (27) of the ring sections engage to hold the band in place on the periphery of the ring when assembled. The ears (26) as well as the band itself may be corrugated if desired as at (28) to increase strength and rigidity. Where the band passes over the ends of the pins it is increased in breadth as at (29) to simulate the contour of a circular disk, and beneath the entire band is a packing strip (30) which is held in place by swaging the edges of the band to form a thin inturned edge (31) as shown in Figure 15 to hold the packing in place. A universal joint ring, and pins sealed after the manner herein described is oil tight, and the usual shell or casing may be entirely dispensed with. And in practice the sealing means may be quickly and easily applied without skilled labor, and without machining, and entrance of dust and other extraneous matter to the bearing surfaces is prevented.

While it is believed that the operation and construction of my oil sealing means will be apparent from the foregoing, it is pointed out that the use of a so-called packing gland is eliminated, and so also is the use of a cap with packing to prevent leakage of oil. All that is necessary in the preferred form is to groove the sections of the ring to receive the spring metal disk, or in the alternative form to provide a flanged boss to hold the disk; while in the remaining form the band does not add to the weight of the device as a whole. My oil seal is effective and is easily assembled, and when used with a universal joint as in the present instance, no casing or shell is necessary.

While the combination and arrangement of parts heretofore described constitute the preferred forms of my invention, it is desired to again point out that the scope of the invention should only be determined by the claims appended hereunto.

I claim—

1. An oil seal for universal joints of the type wherein a ring is provided to retain the knuckle pins, comprising a relatively thin metallic band covering the peripheral surface of the ring and passing over the ends of the pins; the edges of the band being substantially coincident with the edges of the ring, and extensions formed on the band at either side of that portion where the band passes over the ends of the pins, said extensions bent down along the sides of the ring to provide ears for holding the band in place, and a packing strip beneath the band, the edges of the band being swaged down to form an inturned part engaging and holding the packing strip in place.

2. An oil seal for universal joints of the type wherein a ring is provided to retain the knuckle pins, comprising a relatively thin metallic band covering the peripheral surface of the ring and passing over the ends of the pins, the respective outside edges of the band being substantially coincident with the edges of the ring, and opposed extensions formed on the band at either side of that portion where the band passes over the ends of the pins, said extensions being bent down to lie against the sides of the ring to hold the band in place, and said extensions being corrugated, and a packing strip beneath the band, the respective edges of the band being swaged to form inturned parts engaging and holding the packing strip in place.

In testimony whereof, I affix my signature hereunto.

VILLOR P. WILLIAMS.